(12) United States Patent
Zelkin

(10) Patent No.: US 6,745,219 B1
(45) Date of Patent: Jun. 1, 2004

(54) ARITHMETIC UNIT USING STOCHASTIC DATA PROCESSING

(76) Inventor: Boris Zelkin, Rama St. 28/9, Tel Aviv 69186 (IL)

(*) Notice: Subject to any disclaimer, the term of this patent is extended or adjusted under 35 U.S.C. 154(b) by 360 days.

(21) Appl. No.: 09/853,747

(22) Filed: May 14, 2001

Related U.S. Application Data (60) Provisional application No. 60/208,915, filed on Jun. 5, 2000.

(51) Int. Cl.$^7$ .............................. G06F 7/38; G06F 1/02; G06J 1/00
(52) U.S. Cl. ................ 708/490; 708/250; 708/523; 708/3
(58) Field of Search ............. 708/490, 3, 801, 708/523, 250–256; 380/46

(56) References Cited

U.S. PATENT DOCUMENTS

| | | | |
|---|---|---|---|
| 4,115,867 A | | 9/1978 | Vladimirov et al. ........ 364/900 |
| 4,176,399 A | * | 11/1979 | Hoffmann et al. .......... 708/250 |
| 4,219,877 A | | 8/1980 | Vladimirov et al. ........ 364/554 |
| 4,493,046 A | | 1/1985 | Watanabe ................... 364/717 |
| 4,972,363 A | | 11/1990 | Nguyen et al. ............. 364/807 |
| 5,046,036 A | | 9/1991 | Tezuka ........................ 364/717 |
| 5,170,071 A | * | 12/1992 | Shreve ........................ 706/43 |
| 5,317,528 A | * | 5/1994 | Gofman ...................... 708/250 |
| 5,412,587 A | | 5/1995 | Holt et al. ................... 364/717 |
| 5,828,752 A | * | 10/1998 | Iwamura et al. ............. 380/46 |
| 6,141,668 A | * | 10/2000 | Shimada ..................... 708/250 |
| 6,414,949 B1 | * | 7/2002 | Boulanger et al. .......... 370/335 |

FOREIGN PATENT DOCUMENTS

SU  718843  2/1980

* cited by examiner

*Primary Examiner*—Tan V. Mai
(74) *Attorney, Agent, or Firm*—Blank Rome LLP (57) ABSTRACT

Arithmetic unit having a set of multipliers and adders receives initial data in the form of both digital operands and analog signals. Stochastic multipliers and adders carry out multiplication and addition. The initial data are converted to pseudorandom sequences to perform arithmetical operations of multiplication and addition. The arithmetic unit includes an n-bit pseudorandom numbers generator (12) that generates M-sequences with the period of $N=2^n-1$ time slots. The M-sequences are used in two logic units (14, 16) that generate pseudorandom sequences with a given probability of occurrence of 1's. The digital operands are converted to pseudorandom sequences by data-to-sequence converters (54) that receive n-bit operand and pseudorandom sequences with a given probability of occurrence of 1's from one of the logic units. Multiplication is carried out by stochastic multipliers (30) on the operands that were converted to pseudorandom sequences by the two separate data-to-sequence converters. A stochastic adder (40) provides addition of k summands represented by stochastic sequences. All arithmetic operations are performed with an accuracy of 1/N for the length $N=2^n-1$ time slots of the pseudorandom sequences.

20 Claims, 9 Drawing Sheets

| Time slot | M-sequences | | | | Sequences Logic Unit 1 | | | | | Sequences Logic Unit 2 | | | | | Example 1/2*1/2=1/4 | | | Example 3/4*1/4=3/16 | | |
|---|---|---|---|---|---|---|---|---|---|---|---|---|---|---|---|---|---|---|---|---|
| | M1 | M2 | M4 | M4 | 1/2 | 1/4 | 1/8 | 1/16 | | 1/2 | 1/4 | 1/8 | 1/16 | | A=1/2 LU1 | B=1/2 LU2 | C c(i) | A=3/4 LU1 | B=1/4 LU2 | C c(i) |
| 0 | 1 | 1 | 1 | 1 | | | | | | | | | | | | | | | | |
| 1 | 0 | 1 | 1 | 1 | 0 | 1 | 0 | 0 | | 1 | 0 | 0 | 0 | | 0 | 1 | 0 | 1 | 0 | 0 |
| 2 | 0 | 0 | 1 | 1 | 0 | 0 | 1 | 1 | | 1 | 0 | 0 | 0 | | 0 | 1 | 0 | 0 | 0 | 0 |
| 3 | 0 | 0 | 0 | 0 | 1 | 0 | 0 | 0 | | 0 | 0 | 1 | 0 | | 1 | 0 | 0 | 1 | 0 | 0 |
| 4 | 1 | 1 | 0 | 0 | 0 | 1 | 1 | 0 | | 0 | 1 | 0 | 0 | | 0 | 0 | 0 | 0 | 0 | 0 |
| 5 | 0 | 0 | 1 | 1 | 1 | 0 | 0 | 0 | | 1 | 0 | 0 | 0 | | 1 | 1 | 1 | 1 | 1 | 1 |
| 6 | 1 | 1 | 0 | 0 | 0 | 1 | 0 | 0 | | 0 | 1 | 0 | 0 | | 1 | 0 | 0 | 1 | 0 | 0 |
| 7 | 0 | 0 | 1 | 1 | 1 | 0 | 0 | 0 | | 1 | 0 | 0 | 0 | | 1 | 1 | 1 | 1 | 1 | 1 |
| 8 | 1 | 1 | 0 | 0 | 0 | 1 | 1 | 0 | | 0 | 1 | 0 | 0 | | 0 | 0 | 0 | 0 | 0 | 0 |
| 9 | 0 | 0 | 1 | 1 | 1 | 0 | 0 | 0 | | 1 | 0 | 0 | 0 | | 1 | 1 | 1 | 1 | 1 | 1 |
| 10 | 1 | 1 | 1 | 1 | 1 | 1 | 0 | 0 | | 0 | 1 | 0 | 0 | | 1 | 0 | 0 | 1 | 0 | 0 |
| 11 | 1 | 1 | 0 | 0 | 1 | 0 | 0 | 0 | | 1 | 0 | 0 | 0 | | 1 | 1 | 1 | 1 | 1 | 1 |
| 12 | 1 | 1 | 1 | 1 | 1 | 1 | 0 | 0 | | 0 | 1 | 0 | 0 | | 1 | 0 | 0 | 1 | 0 | 0 |
| 13 | 1 | 1 | 0 | 0 | 1 | 0 | 0 | 0 | | 1 | 0 | 0 | 0 | | 1 | 1 | 1 | 1 | 1 | 1 |
| 14 | 1 | 1 | 1 | 1 | 1 | 1 | 0 | 0 | | 0 | 1 | 0 | 0 | | 1 | 0 | 0 | 1 | 0 | 0 |
| 15 | 0 | 1 | 1 | 1 | 1 | 0 | 0 | 0 | | 1 | 0 | 0 | 0 | | 1 | 1 | 1 | 1 | 0 | 0 |
| | | | | | 8/15 | 4/15 | 2/15 | 1/15 | | 8/15 | 4/15 | 2/15 | 1/15 | | 8/15 | 8/15 | 4/15 | 12/15 | 4/15 | 3/15 |

FIG.8

| Time slot | M-sequences M1 M2 M4 M4 | m(t) m/15 | Example for: S=1/3(1/2+1/4+1/2)=6.6/16 | | | | | Example for: S=1/3(1/2+3/16+3/4)=7.6/16 | | | | | |
|---|---|---|---|---|---|---|---|---|---|---|---|---|---|
| | | | x(t)=1/2 | from Fig.8 C=1/4 | byLU1 D=1/2 | Result | Rem | x(t)=1/2 | from Fig.8 C=3/16 | by LU2 D=3/4 | Result | Rem |
| | | | x(i) | c(i) | d(i) | s(i) | r(i) | x(i) | c(i) | d(i) | s(i) | r(i) |
| 0 | 1 1 1 1 | | | | | | | | | | | |
| 1 | 0 0 0 1 | 7 | 1 | 0 | 0 | 0 | 1 | 1 | 0 | 1 | 0 | 2 |
| 2 | 0 0 1 1 | 3 | 1 | 0 | 0 | 1 | 2 | 1 | 0 | 1 | 1 | 1 |
| 3 | 0 1 0 1 | 1 | 1 | 0 | 1 | 1 | 0 | 1 | 0 | 0 | 1 | 0 |
| 4 | 1 0 0 0 | 8 | 1 | 0 | 0 | 0 | 2 | 1 | 0 | 1 | 0 | 1 |
| 5 | 0 0 1 0 | 4 | 1 | 0 | 1 | 0 | 0 | 1 | 0 | 1 | 1 | 2 |
| 6 | 0 1 0 0 | 2 | 0 | 1 | 0 | 1 | 1 | 0 | 1 | 0 | 0 | 1 |
| 7 | 1 0 0 1 | 9 | 1 | 0 | 1 | 0 | 0 | 0 | 0 | 1 | 1 | 2 |
| 8 | 0 1 1 0 | 12 | 0 | 1 | 1 | 1 | 1 | 0 | 1 | 1 | 0 | 2 |
| 9 | 1 1 0 0 | 6 | 1 | 0 | 0 | 0 | 2 | 0 | 0 | 1 | 1 | 2 |
| 10 | 1 0 1 1 | 11 | 0 | 1 | 1 | 1 | 0 | 0 | 1 | 1 | 0 | 2 |
| 11 | 0 1 1 1 | 5 | 1 | 0 | 0 | 1 | 2 | 0 | 0 | 1 | 1 | 0 |
| 12 | 1 1 1 0 | 10 | 0 | 1 | 1 | 1 | 0 | 0 | 1 | 1 | 1 | 2 |
| 13 | 1 1 0 1 | 13 | 0 | 1 | 1 | 0 | 2 | 0 | 1 | 1 | 0 | 1 |
| 14 | 1 0 1 0 | 14 | 0 | 0 | 1 | 1 | 2 | 0 | 1 | 1 | 1 | 2 |
| 15 | 0 1 0 1 | 15 | | 1 | 1 | 0 | | 0 | 0 | 1 | 0 | |
| | 0 1 1 1 | | 8/15 | 4/15 | 8/15 | 6/15 | | 8/15 | 3/15 | 12/15 | 7/15 | |

ARITHMETIC UNIT USING STOCHASTIC DATA PROCESSING

This application claims the benefit of Provisional application Ser. No. 60/208,915, filed Jun. 5, 2000.

BACKGROUND OF THE INVENTION

1. Field of the Invention

The present invention relates to computing systems having arithmetic units that utilize stochastic data processing. More particularly, the invention relates to a computer system having arithmetic units in which analog signals and digital operands are converted to stochastic representations using pseudorandom M-sequences.

2. Description of the Related Art

Stochastic computing is based on representation of digital operands and analog signals by binary stochastic sequences. Stochastic computing is efficient due to simple hardware of basic computing elements: adders and multipliers. In particular, stochastic multiplication is performed by the logic AND gate for operands A and B within data domain (0,1) or XNOR for operands A and B within data domain (−1,1).

A pseudorandom numbers generator is a primary source of stochastic sequences. The pseudorandom numbers generator generates binary pseudorandom M-sequences having a period of $N=2^n-1$ time slots, which is provided at the output of an n-bit linear feedback shift register. Digital operands and analog signals are converted to their representations by stochastic sequences by comparing the digital operands and analog signals to a pseudorandom sequence of numbers. Either a digital or an analog comparator performs this operation. A counter performs the reverse operation, of converting a stochastic sequence into a digital operand.

The operand is a fractional number having a numerator that corresponds to the number of 1's in a pseudorandom sequence for the period $N=2^n-1$ time slots, where N stands for denominator of the fractional number. The accuracy of the conversion of the operand is determined by the length N of the pseudorandom sequence and is equal to 1/N.

The performance of stochastic multiplication requires independence of sequences at the multiplier's inputs. The stochastic independence is achieved by shifting the phase position of sequences with respect to each other, by placing a delay circuit (e.g., shift register) at one of the multiplier's inputs. The value of a delay is predetermined and is defined as the "suitable delays value".

For the given method, the accuracy of multiplication is defined as the "average accuracy", which depends from the multiplied operands and the delay circuit. However, for n-bit operands representation by pseudorandom sequences with accuracy of $1/(2^n-1)$, the error of multiplication is not constant and exceeds the accuracy of representation of the operands.

A device for multiplication is shown in USSR Certificate of Authorship No. 718843, published Feb. 28, 1980. The device has an AND block for probablility and an AND-OR block for conversion of the digital operands to pseudorandom sequences. By this conversion, the stochastic independence of sequences at the multiplier's input is achieved with an accuracy of $1/(2^n-1)$. The circuit diagram of this device for multiplication, however, is only for two operands.

Addition of two operands A and B represented by stochastic sequences is carried out by the adder, which is a logic OR gate. The required incompatibility of pseudorandom sequences at the adder's inputs is achieved by preliminarily multiplying each of the two sequences by an independence sequence with a probability of 1's equal to 1/2. Hence, while one of the adding sequences is multiplied by such sequence, another one is multiplied by its inverse value. The result of the addition is (A+B)/2.

For sequences that are formed by one pseudorandom number generator, a similar incompatibility can be carried out by switch operation. Thus, the result of addition approximately corresponds to the arithmetical mean of A and B. The specified methods do not carry out addition of two n-bit operands represented by pseudorandom sequences with an accuracy of $1/(2^n-1)$ on length $N=2^n-1$ time slots.

The addition of more than two operands is performed by a tree-like structure. The result of addition is a complex weighted add, where the weight factor does not uniformly represent the adding sequences. In particular, when two operands A and B are added, a stochastic sequence representing result (A+B)/2 is produced. For addition of the three operands A, B and C, a stochastic sequence representing the result (C+(A+B)/2)/2 is produced.

The given method makes performance of addition in systems of data processing inconvenient. For these reasons the method of stochastic data processing has not found practical application since it does not provide performance of arithmetic operations of multiplication and addition with a given accuracy $1/(2^n-1)$ on length $N=2^n-1$ time slots of pseudorandom sequences.

SUMMARY OF THE INVENTION

The present invention provides a method and apparatus for conversion of a signal to a sequence, as well as for multiplication and addition, using a stochastic data processing technique. Arithmetic operations are carried out above n-bits operands represented by pseudorandom sequences of length $N=2^n-1$ time slots, with an accuracy of arithmetical operations equal to $1/(2^n-1)$. Initial data is converted to sequences by one pseudorandom numbers generator.

In the preferred embodiment, the method and apparatus according to the present invention comprises: two logic units that generate incompatible pseudorandom sequences with a given probability of occurrence of 1's; a set of data-to-sequence converters that convert n-bits digital operands to pseudorandom sequences using sequences of the logic unit; a set of stochastic multipliers, each of which consists of a stochastic multiplier core and two data-to-sequence converters providing conversion of a pair of n-bits digital operands to pseudorandom sequences using a separate logic unit, which provides desirable accuracy of multiplication; a set of stochastic adders, each of which carries out addition of k summands represented by stochastic sequences received simultaneously on k inputs of adder. The adder produces an output signal that corresponds to a weighted (1/K) add of the k summands.

All of the operations of the stochastic data processing system—arithmetical operations and conversion of signals—are carried out in parallel and simultaneously during the period $N=2^n-1$ time slots of the pseudorandom numbers generator.

DETAILED DESCRIPTION OF THE INVENTION

In describing preferred embodiment of the invention, specific terminology will be resorted to for the sake of clarity. However, the invention is not intended to be limited to the specific terms so selected.

Figure 1:
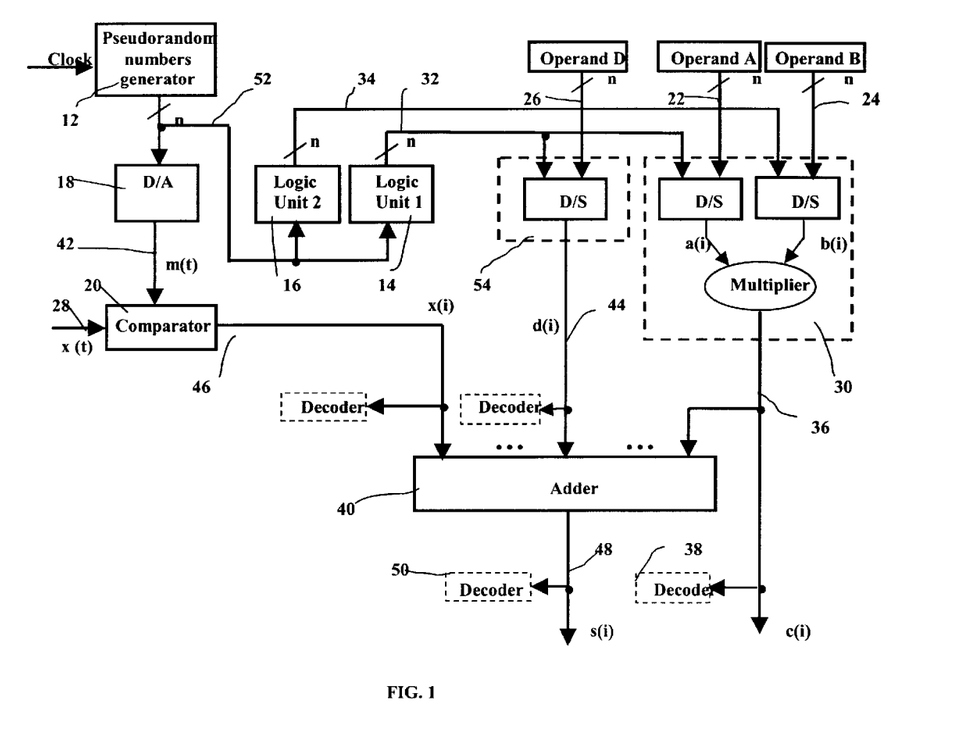
FIG. 1 is a block diagram of a stochastic processing system according to the present invention.

FIG. 1 illustrates the stochastic data processing system and method in accordance with the present invention. The system receives initial data in the form of digital operands A, B or D on n-bits lines 22, 24, 26 and in the form of an analog signal on a line 28. These data are interpreted as fractional numbers within a data domain of (0,1) for a positive fraction, or (−1,1) for a bipolar fraction. The system produces output signals in digital or stochastic form, representing the result of arithmetical operations of multiplication on line 36, the result of addition on line 48 and the result of conversion of digital operands or analog signals on lines 44 and 46, respectively.

The system comprises a pseudorandom numbers generator 12 that is connected to two logic units 14 and 16, and to a data-to-analog (D/A) converter 18 by an n-bit line 52. The logic units 14 and 16 generate pseudorandom sequences with a given probability of occurrence of 1's. The D/A converter 18 produces a stochastic analog signal by levels, which are interpreted as fractional numbers $m(t)$, laying in the same data domain as the initial data.

The system includes analog comparators 20, which compare an input analog signal $x(t)$ received on line 28 to a stochastic analog signal $m(t)$ that is produced on line 42. If the input analog signal $x(t)$ is greater than or equal to the stochastic analog signal $m(t)$, then the signal is represented by 1's in the current time slot. However, if the input analog signal $x(t)$ is less than the stochastic analog signal $m(t)$, then the comparator 20 output signal is represented by 0's in the current time slot. The output stochastic sequence $x(i)$ represents an analog signal $x(t)$ and is transferred to the adder as one of the summands on line 46. Although only a single analog comparator 20 is shown in FIG. 1, any suitable number of analog comparators 20 can be provided.

The system also includes a data-to-sequence (D/S) converter 54, which receives an n-bit operand D on line 26 and pseudorandom sequences with a given probability of occurrence of 1's on n-bit line 32. Although only a single D/S converter 54 is shown in FIG. 1, any suitable number of D/S converters 54 can be provided. The operand D is represented by the pseudorandom sequence $d(i)$ on line 44. The operand D is transferred to the adder as one of the summands, or can be used for other arithmetical operation or as an output signal.

The system also has a multiplier 30 that receives n-bits digital operands A and B on n-bit lines 22 and 24, and pseudorandom sequences with a given probability of occurrence of 1's on n-bit lines 32 and 34. Although only a single multiplier 30 is shown in FIG. 1, any suitable number of multipliers 30 can be provided. The output stochastic signal $c(i)$ on line 36 represents the result of multiplication $C=A*B$, and is an output signal of the stochastic data processing system. The output signal $c(i)$ also may be transferred to the adder 40 as one of the summands or decoded to digital form by the counter 38 and used further if necessary.

The system also has an adder 40 that receives the summands representing analog signals transferred to the adder on line 46, digital operands transferred to the adder on line 44, results of arithmetic operations such as multiplication transferred to the adder on line 36. Although only a single adder 40 is shown in FIG. 1, any suitable number of adders 40 can be provided. The output stochastic signal $s(i)$ on a line 48 represents the result of the addition of S, and $s(i)$ is an output signal of the stochastic data processing system. The output $s(i)$ also may be decoded to digital form by the counter 50 and used further if necessary.

The system also has digital counters 38, 50 that receive the pseudorandom sequence. The counter decodes a pseudorandom sequence to digital form by counting the number of 1's in the pseudorandom sequence for the period N. The data obtained by the counter is interpreted as a fractional number within the same data domain as the initial data.

Figure 2:
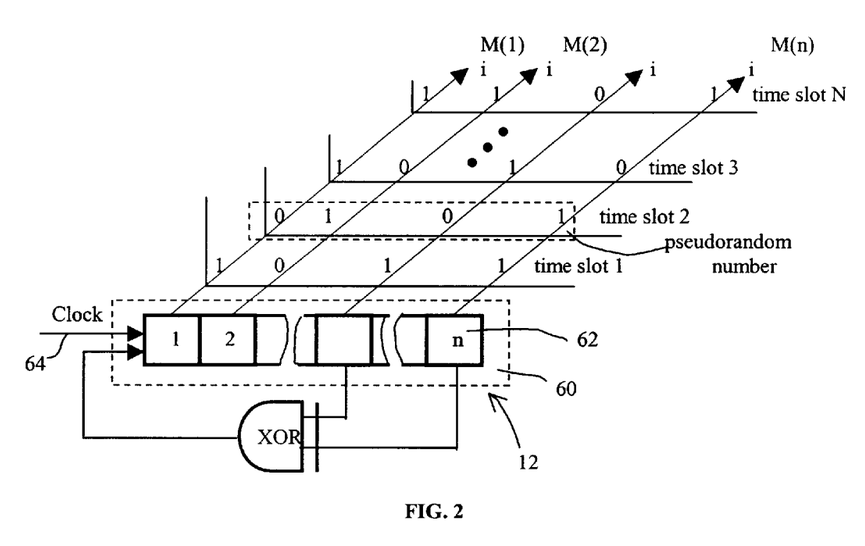
FIG. 2 illustrates a pseudorandom numbers generator and process of generation of M-sequences.

FIG. 2 illustrates a pseudorandom numbers generator 12 using a conventional circuit of n-bit linear feedback shift register 60, consisting of "n" memory cells 62, at the outputs of which the independent M-sequences by the period $N=2^n-1$ time slots are generated. The appropriate feedback is determined by primitive polynomial of n-th order, which is tabulated, for example, in Gill, Arthur "Linear Sequential Circuits", 1967.

The M-sequence is a balanced binary sequence with $(N+1)/2$ ones and $(N-1)/2$ zeros, which defines it as a sequence with a probability of occurrence of 1's equal to 1/2 with an accuracy of $1/(2^n-1)$.

In response to the signal Clock on line 64, in each time slot the "n" memory cells 62 generate sequences of 1's and 0's that represent M-sequences: $M(1), M(2), \ldots, M(n)$. The n-bit binary number taking place in a given time slot in register 60 is the current pseudorandom number. The pseudorandom number is interpreted as a current value of $m(t)$ after D/A conversion. The process of generation of the one period M-sequences for n=4 is clarified by examples shown in the tables FIG. 8 and FIG. 9.

Figure 3A:
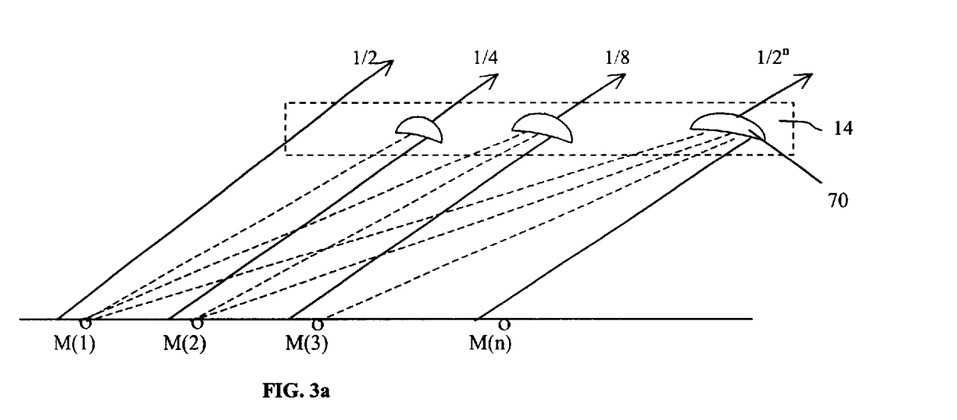
FIGS. 3a–3b illustrate a logic unit and the process of generation of incompatible pseudorandom sequences with a given probability of occurrence of 1's in accordance with the present invention.
Figure 3B:
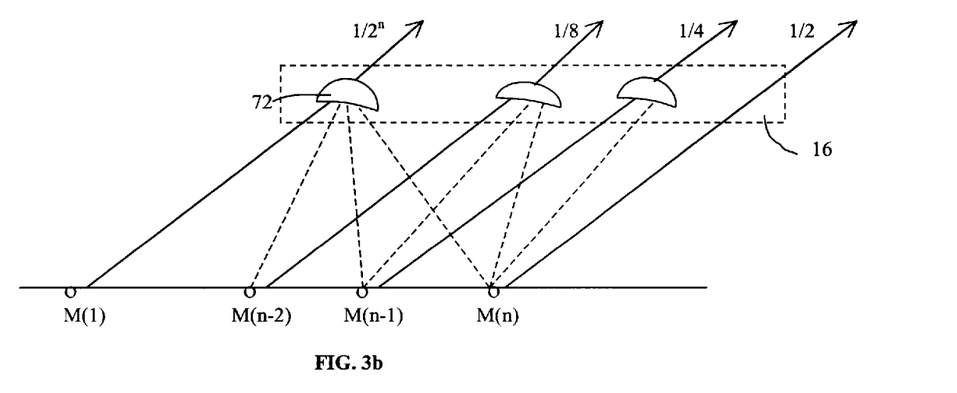

FIGS. 3a–3b illustrate a logic unit and process of generation of incompatible pseudorandom sequences with a given probability of occurrence of 1's. Logic unit 14 and logic unit 16 have a set of logic AND gates 70 and a set of logic AND gates 72 respectively. Each of the AND gates 70, 72 receives M-sequences from the pseudorandom numbers generator 12 for the n-bit line 52.

The logic AND gates 70 and the logic AND gates 72 compose M-sequences in such a way that they generate respective outputs of incompatible pseudorandom sequences with a given probability of occurrence of 1's equal 1/2, 1/4, ..., $1/2^n$ and an accuracy of $1/(2^n-1)$. The pseudorandom sequence with a probability of occurrence of 1's equal to 1/4 is performed by ANDing the above two M-sequences: M(1) and M(2).

The pseudorandom sequence with a probability of occurrence of 1's equal to 1/8 is performed by ANDing the above three M-sequences: M(1), M(2) and M(3). The pseudorandom sequence with a probability of occurrence of 1's equal to $1/2^n$ is performed by operation AND of the above n M-sequences: M(1), M(2), . . . , M(n). The mutual incompatibility pseudorandom sequences in each logic unit is achieved by using, in the AND operation, both direct M(j)-sequences and inverse ~M(j)-sequences, obtained at the outputs of memory cells 62.

The direct order of connection of the input M-sequences in the logic unit 14 consisting of logic gates 70 are applied. The reverse order of connection of input M-sequences in logic unit 16 consisting of logic gates 72 are applied. Combinations of M-sequences are applied on the inputs of the AND gates to generate pseudorandom sequences with a given probability of occurrence of 1's are shown in Table 1.

TABLE 1

| Probability | Logic Unit 14 | Probability | Logic Unit 16 |
|---|---|---|---|
| 1/2 | M(1) | 1/2 | M(n) |
| 1/4 | ~M(1)*M(2) | 1/4 | ~M(n)*M(n−1) |
| 1/8 | ~M(1)*~M(2)*M(3) | 1/8 | ~M(n)*~M(n−1)*M(n−2) |
| . . . | . . . | . . . | . . . |
| $1/2^n$ | ~M1*~M2*~M3* . . . *M(n) | $1/2^n$ | ~M(n)*~M(n−1)*~M(n−2)* . . . *M(1) |

FIGS. 3a and 3b illustrate the logic units 14 and 16. The process of generation of incompatible pseudorandom sequences with a given probability of occurence of 1's is clarified by examples in table FIG. 8.

Figure 4:
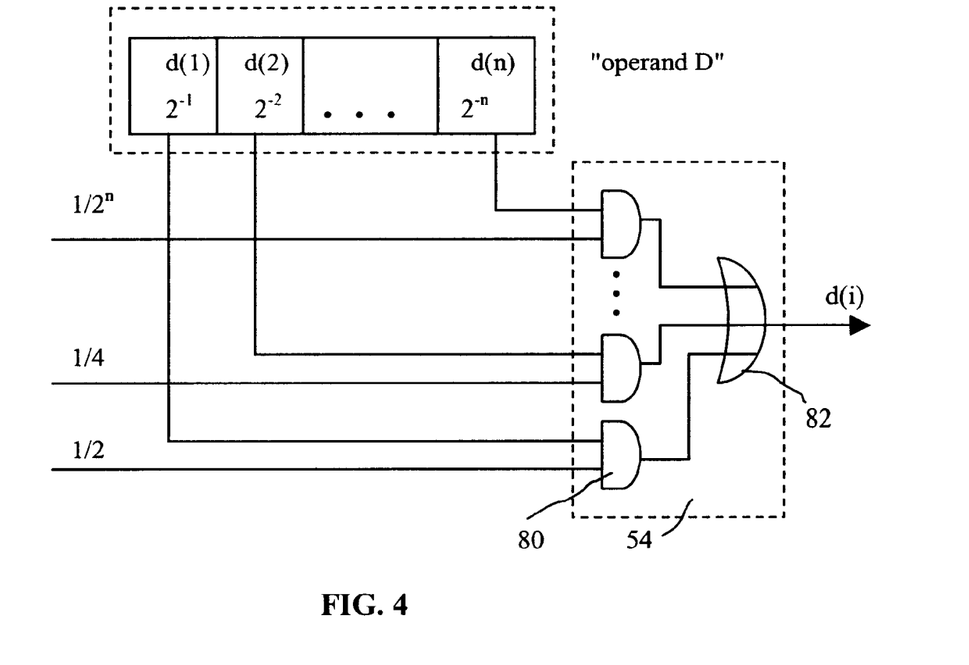
FIG. 4 is a circuit diagram of a data-to-sequence converter in accordance with the present invention.

The data-to-sequence (D/S) converter 54 encodes a digital operand to a pseudorandom sequence. As illustrated in FIG. 4, the data-to-sequence (D/S) converter 54 includes n-number of AND gates 80 and one OR gate 82. The first inputs of the AND gates 80 are connected to n-bit of operand D, and the second inputs of the AND gates 80 are connected to the output of the logic unit 14. The output of each of the AND gates 80 are connected to n inputs of the OR gate 82, thus producing a psudorandom sequence d(i) representing the operand D. The logic unit 14 or logic unit 16 can be used to encode a digital operand.

The operand D is a binary fraction D=0.d(1)d(2) . . . d(n), in which the weights of the most significant bit d(1) and the least significant bit d(n) are equal to 1/2 and to $1/2^n$ respectively. Unchangeable during the period $N=2^n-1$ time slots operand D connect up, through its output of n bits, the incompatible pseudorandom sequences with appropriate probability of occurrence of 1's. These sequences are composed of the OR gate 82 in pseudorandom sequence d(i).

In each time slot of the output of the OR gate 82, the value 1 or 0 of pseudorandom sequence d(i) is formed. The number of 1's in a sequence d(i) for the period $N=2^n-1$ time slots corresponds to the operand D with an accuracy of $1/(2^n-1)$. The examples in the tables FIG. 8 and FIG. 9 clarify the process of encoding digital operands.

Figures 5, 6A, 6B:
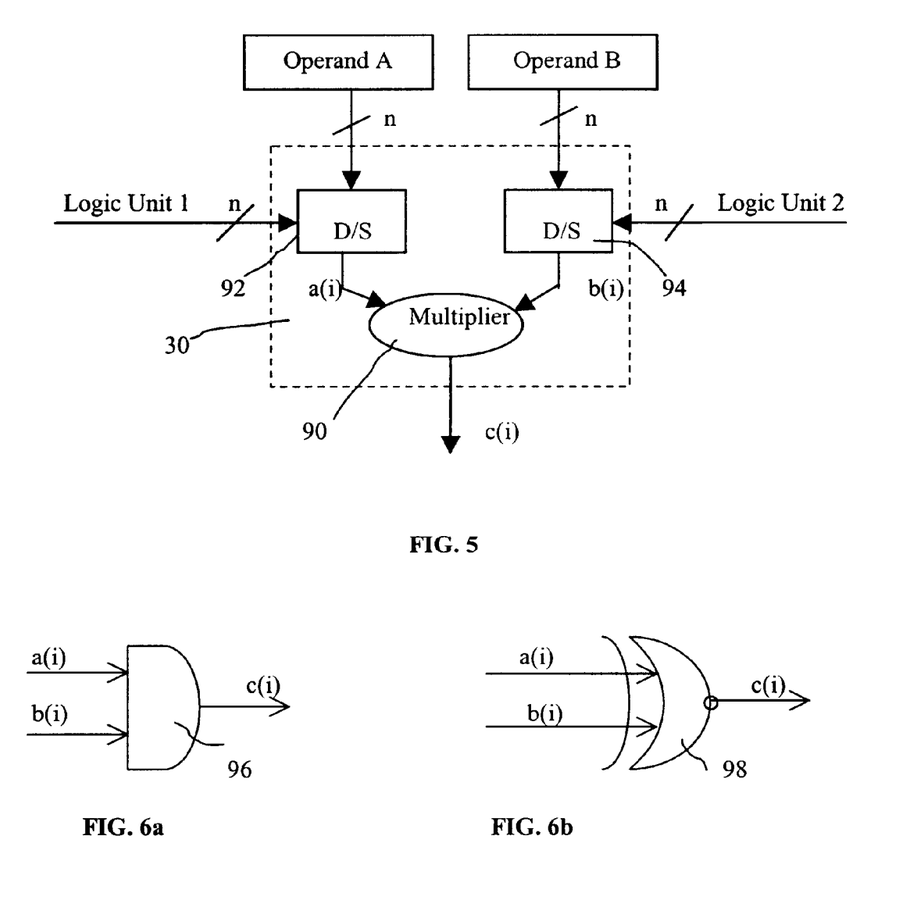
FIG. 5 is a circuit diagram of a stochastic multiplier in accordance with the present invention.
FIGS. 6a–6b show two embodiments of a stochastic multiplier core in accordance with the present invention.

The stochastic multiplier 30 performs the multiplication operation, as shown in FIG. 5. The stochastic multiplier 30 has a stochastic multiplier core 90 and two D/S converters 92 and 94. The first inputs of the D/S converter 92 are connected to n-bit of operand A, and the second inputs are connected to the appropriate outputs of logic unit 14. The first inputs of the D/S converter 94 are connected to n-bit of operand B, and the second inputs are connected to the appropriate outputs of the logic unit 16.

The outputs of the D/S converter 92 and of the D/S converter 94 are connected to the first and second inputs of the stochastic multiplier core 90. The multiplier core 90 produces an output signal c(i) represented by a pseudorandom sequence for a line 36 or its digital form decoded by counter 38. The stochastic multiplier core 90 has two embodiments depending on data domain of operands. The logic AND gate 96 is the multiplier for operands A and B within data domain (0,1) representing the positive binary fraction. The logic gate XNOR 98, carrying out a logic function of "equality", is the multiplier for operands A and B within data domain (−1,1) representing the bipolar binary fraction. These two embodiments of the stochastic multiplier core are shown in FIG. 6a and FIG. 6b.

The stochastic multiplier core 90 carries out multiplication of operands A and B represented by pseudorandom sequences a(i) and b(i). Each of these sequences is obtained by the conversion of an operand in the appropriate D/S converter. The output sequence c(i) represents the result of multiplication of C=A*B, and the number of 1's in the sequence c(i) for the period $N=2^n-1$ corresponds to the operand C.

The accuracy of multiplication equal to $1/(2^n-1)$, for the pseudorandom sequence with a length of $N=2^n-1$ time slots, is achieved by the application of two separate logic units used for D/S conversion: one D/S converter uses pseudorandom sequences from the logic unit 14 and another D/S converter uses pseudorandom sequences from the logic unit 16. The examples, given in the table FIG. 8 for positive binary fraction, clarify the multiplication and the formation of sequence c(i).

Figure 7:
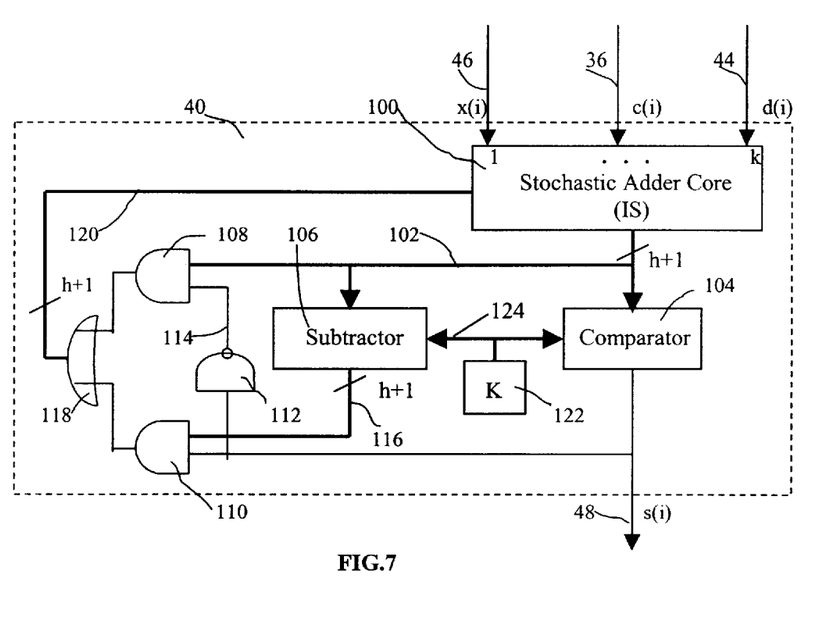
FIG. 7 is a block diagram of a stochastic adder in accordance with the present invention.

FIG. 7 is a block diagram of a stochastic adder 40. The stochastic adder 40 receives k summands, represented by pseudorandom sequences on lines 36, 44, 46, and produces an output signal s(i), represented by stochastic sequence on a line 48 or its digital form decoded by the counter 50. The stochastic adder 40 comprises the stochastic adder core 100, which has first inputs that are connected to "k" lines 36, 44, 46 of the input's summands. The stochastic adder core 100 forms the "interim sum" (IS), which is transferred by (h+1)-bit line 102 to inputs of the comparator 104, subtractor 106 and first inputs (h+1) AND gates 108.

The stochastic adder 40 has a memory 122 that stores the constant K equal to the number k of summands received on inputs of the adder 40. The subtractor 106 carries out subtraction from the "interim sum" of the constant K, which operates on a line 124 of memory 122, and the remainder on (h+1)-bit line 116 enters to the first inputs of (h+1) AND gates 110. The comparator 104 compares value of the "interim sums" to the constant K and produces output signal as a sequence s(i) which is an output of stochastic adder on line 48. The same output of the comparator 104 is connected to the second inputs of (h+1) AND gates 110 and, through the inverter 112 on line 114, is connected to the second inputs of (h+1) AND gates 108.

The output of the AND gate 108 is connected to the first input of (h+1) of the OR gate 118, and the output of the AND gate 110 is connected to the second input of the same OR gate 118. These produce the "returned remainder" (Rem), which is then transferred through (h+1)-bit of feedback line 120 to the second inputs of the stochastic adder core 100. Each time slot of the stochastic adder core 100 defines the number of 1's received at that time slot from k summands, and add this value to the "returned remainder". The result is the current value of the interim sum represented by (h+1) long binary code, where h=int log(2)K.

The binary output sequence s(i) is formed by comparing each current "interim sum" IS with the constant K. For each time slot, if IS is equal to or more than K, a "1" is inserted into s(i). If IS is less than K, then "0" is inserted into s(i). The output sequence s(i) also controls the data that enters the stochastic adder core as a "returned remainder": for the current time slot s(i)=1, the feedback value is (IS−K); for s(i)=0, the feedback is equal to IS. The described processing is performed for each of $N=2^n-1$ time slots. The number of 1's in the sequence s(i) for the period N decoded by the counter 50 corresponds to weighted 1/K sum of k summands. The accuracy of addition equals to $1/(2^n-1)$.

Figure 8:
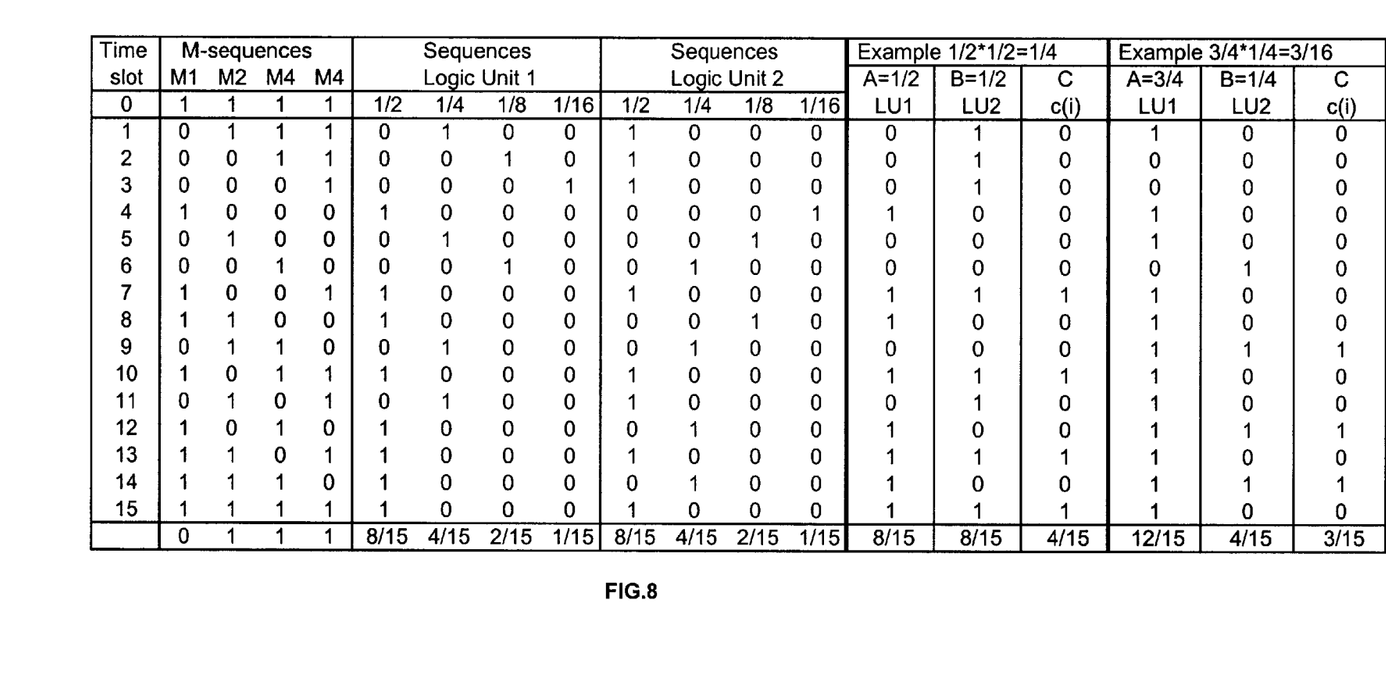
FIG. 8 is a table illustrating the process of generation of various pseudorandom sequences and examples of multiplication.
Figure 9:
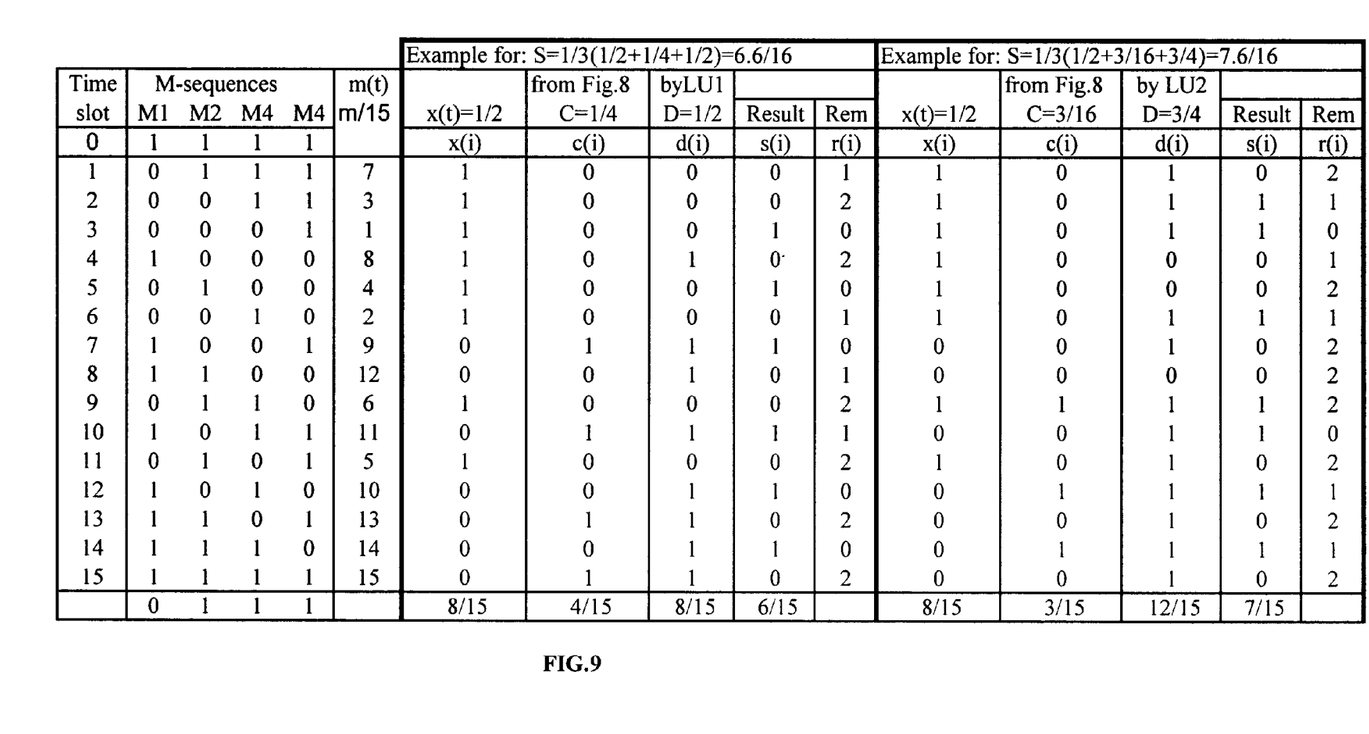
FIG. 9 is a table illustrating the process of generation of various pseudorandom sequences and examples of addition.

The tables in FIG. 8 and FIG. 9 illustrate the arithmetical operations. The examples are given for n=4 bit, which defines the period of the pseudorandom number generator as $N=2^4-1=15$ time slots. Both tables show one period of operation of the pseudorandom number generator. In these examples, the generator work starts from an initial condition in which all of its memory cells are in a state "1". Both tables in FIG. 8 and FIG. 9 illustrate the formation of M-sequences. The sequences generated by logic unit 14 and by logic unit 16 are formed as defined in Table 1 above.

The first example of multiplication is shown for the two operands A=1/2 and B=1/2. The operands are converted to a pseudorandom sequence by a respective D/S converter 92, 94, using incompatible pseudorandom sequences with a given probability of occurrence of 1's from respective logic units 14, 16, which is represented in FIG. 8 by the sequence 8/15. The sequence c(i), which is obtained as a logic operation AND of the elements of sequences a(i) and b(i), contains four 1's. Thus, the result of multiplication C=1/4 is represented by sequence c(i)=4/15 that corresponds to accuracy 1/15.

A second example is given for operands A=3/4, B=1/4. The operand A=0.1100 is formed by ORing two incompatible pseudorandom sequences with probability occurrences of 1's equal to 1/2 and to 1/4 from the logic units 14. The resulting sequence is a(i)=12/15. The operand B=0.0100 is converted to pseudorandom sequence b(i)=4/15 by the D/S converter 94, using sequences from the logic units 16. The result of ANDing the above elements of sequences a(i) and b(i) contains three 1's, i.e. the result of multiplication C=3/16 is represented by sequence c(i)=3/15. Thus, this example as well as the previous one illustrates that a desirable accuracy of operation of multiplication is achieved.

The process of addition is given for three summands received from different data sources. In these examples, the operand X represents an input signal x(t)=1/2, where X is within data domain (0,1). The sequence x(i) represents the fraction number 8/15 obtained by comparison of signals x(t) and m(t). The values m(t) are produced by D/A conversion of a sequence of pseudorandom number received from the pseudorandom number generator.

In the first example, the second operand is arbitrarily taken as a sequence c(i)=4/15, which was formed in the previous example of multiplication (table in FIG. 8). The third operand D=1/2 is represented by sequence d(i)=8/15, which is obtained by conversion of an operand D=0.1000 in the D/S converter using incompatible pseudorandom sequences with a given probability of occurrence of 1's from logic unit 14. The sequence s(i)=6/15 is obtained by addition according to the present invention and corresponds to S=1/3 (1/2+1/4+1/2)=6.6/16. The sequence r(i) represents values of the "returned remainder" (Rem) and is given for simplification of account process.

In the second example, the second operand is arbitrary taken as a sequence c(i)=3/15, formed in the second example of multiplication (see table in FIG. 8). The third operand D=3/4 is represented by sequence d(i)=12/15, obtained by conversion of operand D=0.1100 in the D/S converter using incompatible pseudorandom sequences with a given probability of occurrence of 1's from logic unit 16. The obtained sequence s(i)=7/15 represents the result of addition according to the present invention and corresponds to S=1/3 (1/2+3/16+3/4)=7.6/16. Thus, these examples illustrate correctness and accuracy of addition according to the present invention.

Figure 10:
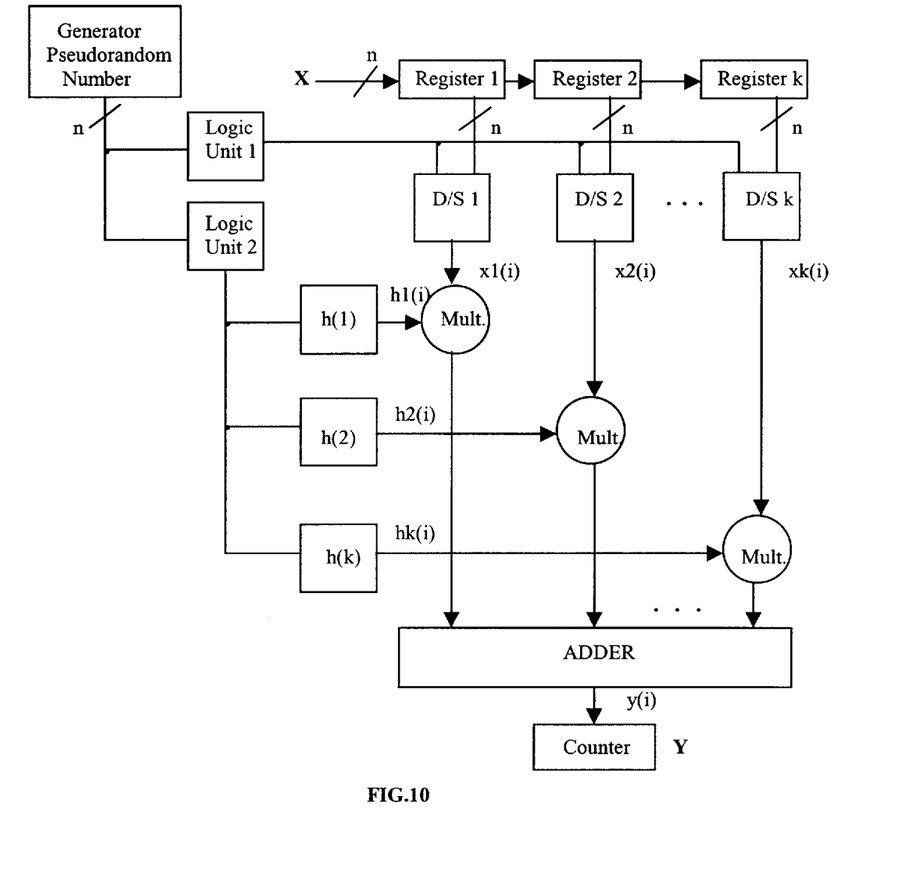
FIG. 10 is a block diagram of a digital filter implemented by stochastic data processing according to the present invention.

One of the most natural applications of stochastic data processing is the performance of digital filters. FIG. 10 illustrates a block diagram of the digital filter implemented according to the present invention. The samplings of an input operand X represented by n-bit binary fraction number are shifted with an interval N by chain consisting of k n-bit registers. The interval N is the period $N=2^n-1$ time slots of the n-bit pseudorandom number generator, comprised in the structure of a digital filter.

The binary number x(j) from each of the registers is converted to pseudorandom sequence by the same D/S converter. All k coefficients h(j) of the filter are converted to pseudorandom sequences by another D/S converter. Therefore, at the inputs of each multiplier pseudorandom sequences generated by separate logic units are formed, which provides an accuracy of multiplication equal to $1/(2^n-1)$ for the period $N=2^n-1$ time slots.

The given example illustrates conventional circuit of the digital filter, in which all k summands formed by multiplication of pseudorandom sequences are introduced into the adder. The output stochastic sequence y(i) represents output signal Y, whose samplings for period $N=2^n-1$ time slots are decoded to digital form by the counter. The sequence of binary numbers formed by the counter, represents the final result of the digital filter, represented in Equation (1).

$$Y = 1/K \sum_{j=1}^{k} x(j) * h(j) \tag{1}$$

The foregoing descriptions and drawings should be considered as illustrative only of the principles of the invention. Numerous applications of the invention will be readily apparent to those skilled in the art. Therefore, it is not desired to limit the invention to the specific examples disclosed, or the exact construction and operation shown and described. Rather, all suitable modifications and equivalents may be resorted to, falling within the scope of the invention.

I claim:

1. An arithmetic unit having a first, second and third n-bit input operands, said arithmetic unit comprising:

an n-bit pseudorandom number generator for generating M-sequences;

a digital-to-analog converter connected to said pseudorandom number generator, said digital-to-analog converter receiving the M-sequences and providing a stochastic analog signal;

an analog comparator connected to said digital-to-analog converter, said analog comparator receiving the stochastic analog signal and having a stochastic sequence output;

a first and second logic unit connected to said pseudorandom number generator, said first and second logic units receiving the M-sequences from said pseudorandom number generator and respectively generating a first and second incompatible pseudorandom sequences;

a data-to-sequence converter having inputs connected to the first n-bit input operand and to the said first logic unit, the data-to-sequence converter generating pseudorandom sequence of the first input operand using the pseudorandom sequence generated by the first logic units;

a stochastic multiplier connected to the second and third n-bit input operands, said stochastic multiplier multiplying the second and third n-bit input operands to provide a multiplied operand output; and, a stochastic adder connected to said analog comparator, to said data-to-sequence converter and to said stochastic multiplier, said stochastic adder adding the stochastic sequence outputted by the analog comparator the pseudorandom sequence generated by the data-to-sequence converter and the multiplied operand output.

2. The arithmetic unit of claim 1, wherein said first and second logic units each have a respective AND gate.

3. The arithmetic unit of claim 1, wherein said stochastic multiplier has a stochastic multiplier core and first and second data-to-sequence converters, the first and second data-to-sequence converters each having a first input connected to the second and third n-bit input operands, a second input connected to the output of a respective said first and second logic units and having an output, the stochastic multiplier core connected to the output of the first and second data-to-sequence converters to provide the multiplied operand output.

4. The arithmetic unit of claim 1, wherein said data-to-sequence converter comprises AND gates and an OR gate, each AND gate having a first input connected to the first n-bit input operand, a second input connected to the first logic unit, and an AND output, the OR gate having inputs connected to the AND output of each of the AND gates and an OR output forming the output of said data-to-sequence converter.

5. The arithmetic unit of claim 1, wherein said first and second logic units generate incompatible pseudorandom sequences having a given probability of occurrence of ones equal to $1/2^n$ and an accuracy of $1/(2^n-1)$.

6. The arithmetic unit of claim 1, wherein said first and second logic units generate incompatible pseudorandom sequences such that said first logic unit generates a direct order of connection of M-sequences and said second logic unit generates a reverse order of connection of M-sequences.

7. The arithmetic unit of claim 1, wherein said n-bit pseudorandom number generator generates direct and inverse binary pseudorandom M-sequences having a period of $N=2^n-1$ time slots.

8. The arithmetic unit of claim 1, wherein said analog comparator compares the stochastic analog signal to an analog input reference signal to provide the stochastic sequence output.

9. The arithmetic unit of claim 8, wherein if the analog input reference signal is greater than or equal to the stochastic analog signal, then said analog comparator provides a 1 in the current time slot of the stochastic sequence output, and if the analog input reference signal is less than the stochastic analog signal, then said analog comparator provides a 0 in the current time slot of the stochastic sequence output.

10. The arithmetic unit of claim 1, wherein the first, second and third n-bit input operands are digital operands.

11. The arithmetic unit of claim 1, wherein said stochastic adder comprises a stochastic adder core having first inputs that are connected to the stochastic sequence output, the output of the data-to-sequence converter and the multiplied operand output of said stochastic multiplier, said stochastic adder core providing an intermediate sum equal to the sum of at least the stochastic sequence output, the output of the data-to-sequence converter and the multiplied operand output.

12. The arithmetic unit of claim 11, wherein said stochastic adder further comprises a memory for storing a constant K equal to a number of summands.

13. The arithmetic unit of claim 12, wherein said stochastic adder further comprises a subtractor connected to said stochastic adder core and subtracting the number of summands K from the intermediate sum to provide a subtractor output.

14. The arithmetic unit of claim 13, wherein said stochastic adder further comprises a comparator connected to said stochastic adder core, said comparator comparing the intermediate sum with the number of summands K and provides an output sequences by value equal to weighted 1/K add of the summands.

15. The arithmetic unit of claim 14, wherein said stochastic adder core has another input, the another input being the subtractor output or the intermediate sum, depending upon a value of the output sequence.

16. The arithmetic unit of claim 15, wherein the another input is the subtractor output if the output sequence is 1 and is the intermediate sum if the output sequence is 0.

17. The arithmetic unit of claim 15, wherein the intermediate sum is equal to the sum of the stochastic sequence output, the output of the data-to-sequence converter, the multiplied operand output and the another input.

18. An arithmetic unit having a first, second and third n-bit input operands, said arithmetic unit having an n-bit pseudorandom number generator for generating M-sequences; a digital-to-analog converter connected to said pseudorandom number generator, said digital-to-analog converter receiving the M-sequences and providing a stochastic analog signal; and, an analog comparator connected to said digital-to-analog converter, said analog comparator receiving the stochastic analog signal and having the stochastic sequence output, said improvement comprising:

a first and second logic unit connected to said pseudorandom number generator, said first and second logic units receiving the M-sequences from said pseudorandom number generator and respectively generating a first and second incompatible pseudorandom sequences;

a data-to-sequence converter connected to the first n-bit input operand and the first logic unit, the data-to-sequence converter generating a pseudorandom sequence of the first input operand using the first logic unit;

a stochastic multiplier connected to the second and third n-bit input operands, said stochastic multiplier multiplying the second and third n-bit input operands to provide a multiplied operand output; and, a stochastic adder connected to said analog comparator, to said data-to-sequence converter and to said stochastic multiplier, said stochastic adder adding the stochastic sequence, the pseudorandom sequence of the first input operand and the multiplied operand output.

19. A method for stochastic data processing, said method comprising:

generating M-sequences and a stochastic sequence output;

receiving, by first and second logic units, the M-sequences and generating a first and second output based upon the M-sequences, the first and second outputs being incompatible pseudorandom sequences with a given probability of occurrence of 1's equal to $1/2, 1/4, \ldots, 1/2^n$, with an accuracy of $1/(2^n-1)$;

receiving, by a data-to-sequence converter, the pseudorandom sequence generated by the first logic unit, and outputting a pseudorandom sequence of a first input operand using the first logic unit;

multiplying, by a stochastic multiplier, the pseudorandom sequences of the second and third n-bit input operands to provide a multiplied operand output; and, adding, by a stochastic adder, the stochastic sequence, the pseudorandom sequence of the first input operand and the multiplied operand output.

20. The method of claim 19, wherein the incompatible pseudorandom sequences is generated by ANDing direct M(j)-sequences and inverse~M(j)-sequences.

* * * * *